Figure 1:
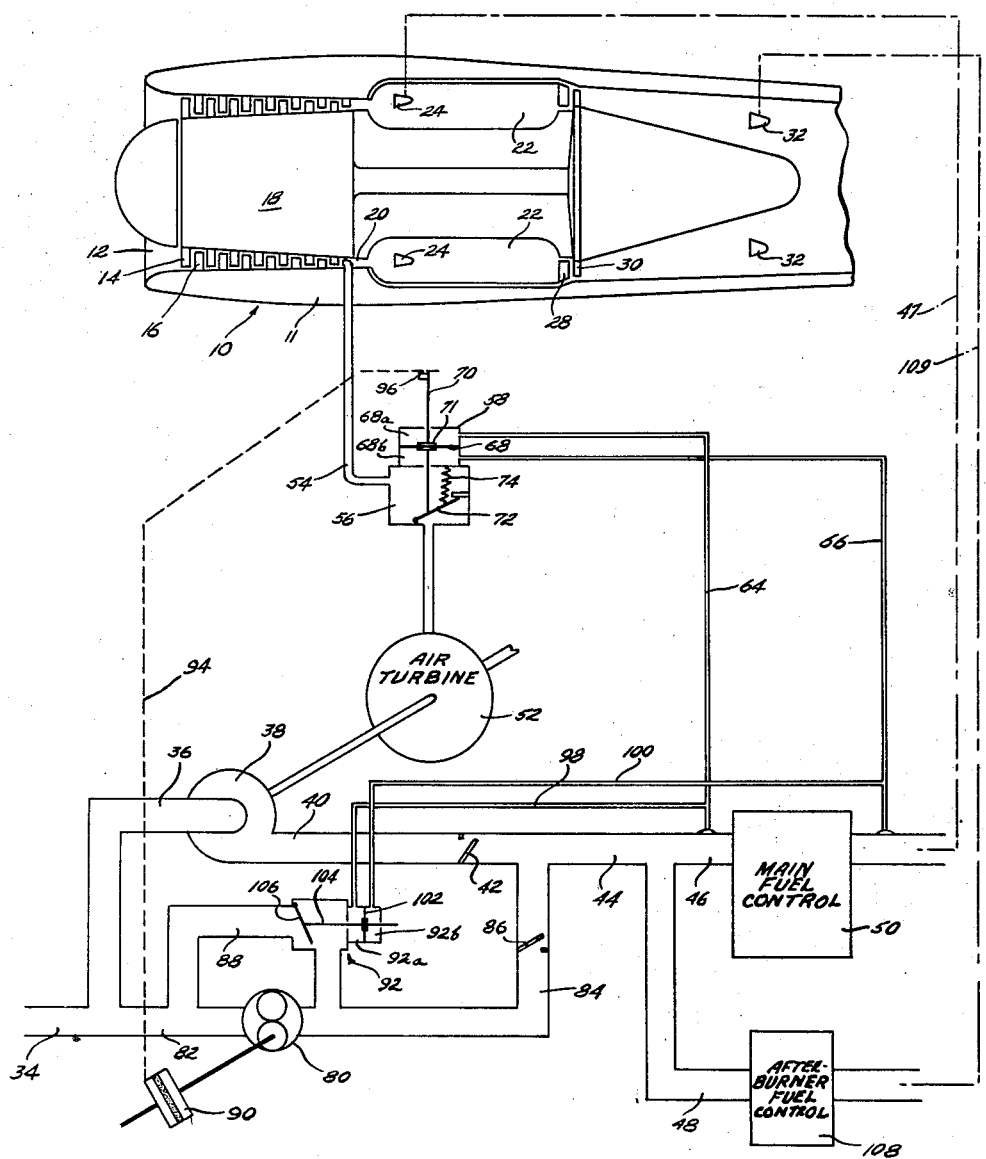

July 26, 1960     M. J. CORBETT     2,946,190
GAS TURBINE ENGINE FUEL SYSTEM AND METHOD
Filed March 26, 1956     2 Sheets-Sheet 1

Inventor
MARSHALL J. CORBETT

July 26, 1960 M. J. CORBETT 2,946,190
GAS TURBINE ENGINE FUEL SYSTEM AND METHOD
Filed March 26, 1956 2 Sheets-Sheet 2

Inventor
MARSHALL J. CORBETT
by Hill, Sherman, Meroni, Gross & Simpson Attys.

2,946,190
Patented July 26, 1960

2,946,190
GAS TURBINE ENGINE FUEL SYSTEM AND METHOD

Marshall J. Corbett, Willoughby, Ohio, assignor to Thompson Ramo Wooldridge Inc., a corporation of Ohio Filed Mar. 26, 1956, Ser. No. 573,856

6 Claims. (Cl. 60—39.28)

This invention relates to gas turbine engines and the like, and more particularly to improved fuel supply means and methods and controls therefor for employment in such an engine.

With the development of high speed aircraft powered by turbo-jet engines, there has come the problem of creating fuel supply systems and methods to provide effective and economical fuel supply at the many different and variable operating conditions encountered. A particular problem has concerned the wide variation in fuel delivery rates to obtain advantages due to substantially lower fuel consumption at high altitudes, while avoiding objectionable characteristics such as weight, fuel temperature increases incident to pumping and by-passing, and the like.

With prior fuel supply systems, excessive fuel recirculation and by-pass has resulted from failure of prior pumping systems to effectively provide the relatively low flow rates needed for economy of high altitude flight. This recirculation and by-pass was not only wasteful of energy, and power, but resulted in an undesired excessive temperature rise of the fuel and accordingly put an undesired burden of cooling on parts of the lubrication system.

Another problem encountered involves the weight of the pump, plumbing, and other dead load associated with pumps of large enough capacity to supply required high flow rate demands, of take-off or emergency for example, particularly since a substantial part of such output is not needed under cruising conditions.

Other problems involve the difficulty of effectively pumping fuel at high temperature, particularly problems such as vapor lock, etc., often encountered in pumping high temperature fuel.

Objects of the present invention include the effective prevention and solution of problems such as have been indicated above.

A more particular object is the provision of a plurality of fuel feed pumps with interrelated controls to effectuate a desired pumping co-operation of the various pump units in accordance with particular operating conditions and demands.

Other objects of the present invention include the provision of a new and improved fuel supply system and method which is adapted to provide wide variations in flow rates, yet with a reduction of weight, a capability of effectively pumping fuels at high temperatures, and without development of an objectionable increase in fuel temperature.

Figure 2:
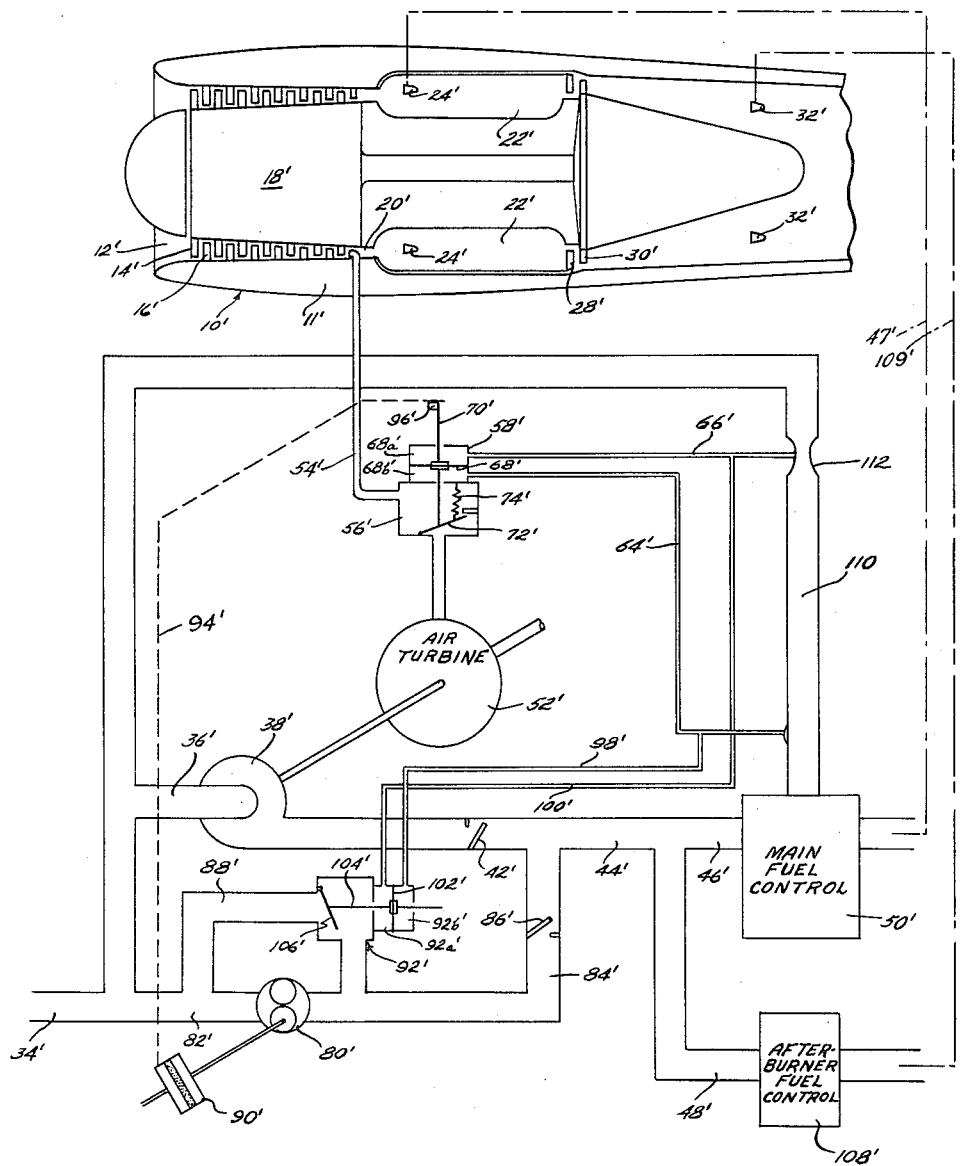

These and other objects, features, and advantages of the present invention will be readily apparent from the following description of illustrative embodiments thereof, taken in conjunction with the accompanying drawings, in which:

Figure 1 is a generally diagrammatical view of a fuel system, according to one embodiment of the present invention; and Figure 2 is a generally diagrammatical view similar to Figure 1, but illustrating another embodiment of the present invention.

By way of example, a jet type engine 10 has been chosen to illustrate the invention. Such an engine 10 as generally diagrammatically illustrated is shown as an elongated casing 11 providing an air intake 12 at its forward end and adapted to channel air through a system of rotor blades 14 and stator blades 16 of an air compressor assembly 18. Adjacent the rear portion 20 of the compressor assembly, the air thus compressed is supplied at high pressure to combustion chambers or cans 22 rearwardly of the compressor assembly. In the combustion chambers 22, the compressed air is mixed and burned with fuel supplied through main fuel nozzles 24, and the exhaust gases are directed through a turbine stator vane assembly 28 and turbine rotor blade assembly 30, and thence outwardly of the engine 10. Rearwardly of the combustion chambers 22 are after burner nozzles 32.

The present present invention provides a new and improved system and method for supplying fuel to such an engine.

According to the present invention, fuel is supplied through a supply conduit 34 from an associated fuel source. This supply conduit leads, through a branch supply conduit 36, to the intake of a non-positive displacement pump such as the centrifugal pump 38 shown.

The centrifugal pump 38 drives the fuel through a conduit 40, past a uni-directional means such as a check valve 42, to an intermediate fuel supply conduit 44. The conduit 44 branches into a main engine supply conduit 46 and an after burner supply conduit 48.

In the supply conduit 46 of the main burners there is provided a fuel feed control device 50 which regulates the flow of fuel to nozzle supply line 47 leading to the main engine nozzles, by throttling the fuel flow in the conduit 46. This control 50 can sense all engine variables such as speed, temperature, pressure and the like, but for the purpose of this invention need only be understood as a fuel flow control establishing variable pressure drops as a function of fuel feed to the engine. Thus when the fuel flow is throttled as when engine demand is low, a high pressure drop will be created across the device and vice versa.

Means are provided to regulate or stabilize the delivery of the pump 38 in response to the throttling effect of the main control device 50. Accordingly, the pump 38 is shown as driven by an air turbine 52 supplied with pressurized bleed air from the rear portion 20 of the compressor assembly 18 through an air-supply conduit 54. An air control valve 56 is located in conduit 54, the valve 56 being shown as regulated as by a regulator 58 adapted to sense differential flow and pressure characteristics across the main control device 50, to actuate the air control valve 56 in a manner to regulate the delivery of pump 38 in accordance with the throttling effected by the main control device 50.

As indicated diagrammatically in the drawings, the arrangement is such that when the main control 50 is in a throttling condition, the pump 38 will be regulated or de-energized sufficiently to reduce its fuel delivery so that it delivers substantially only the amount passing the control device 50.

As shown, this sensing is effected by means such as the sensing tubes 64 and 66 shown as communicating with the fuel conduit 46 at locations therealong respectively before and after the main control device 50. The sensing tubes 64 and 66 are shown as connected at their opposite ends respectively with opposite sides 68a—68b of a diaphragm member 68 in the regulator 58. A plunger 70 is connected to the diaphragm 68 as by retainer plates or nuts 71, and is connected to a valve member 72 of the air valve 56. The valve member 72 is shown as biased in open condition as by a tension spring 74.

Accordingly, it will be observed that when the main control 50 is in a condition to effect throttling of fuel delivered to engine supply line 47, the higher pressure resulting in diaphragm chamber 68a will move the plunger 70 downward to carry valve member 72 into closure position, thus closing the supply of air to the air turbine 52 and hence de-energizing the pump 38 as desired.

If, however, the main control 50 is set open to provide that there is no throttling of the fuel in conduit 46, there will be no pressure differential across the sensing tubes 64 and 66, and correspondingly there will be no pressure differential across diaphragm chambers 68a and 68b. Accordingly, the tension spring 74 will be effective to keep the valve member 72 in open condition, permitting the air valve 56 to pass air to the turbine 52 to continue energization of the pump 38.

Additional pump means are provided desirably in the form of a positive displacement pump such as a gear pump 80 shown. As will now be described, the gear pump 80 is adapted to supply fuel when the control device 50 in conduit 46 is set in wide open position, for example during take off or emergency.

The fuel inlet of gear pump 80 is connected as by conduit 82 to the supply conduit 34, to deliver fuel through an intermediate fuel supply conduit 84 past a check valve 86 in conduit 84, to the main fuel supply line 44. A by-pass line 88 communicates opposite sides of the pump 80.

The effective delivery of gear pump 80 is regulated by two control means. One control is shown as provided by means such as a clutch 90 shown to provide engageable-disengageable drive for the pump 80. Another control means is shown as provided by a by-pass regulator 92 as shown which regulates the by-pass circulation around the gear pump 80. The effect of each of these control means will now be discussed.

The gear pump 80, as has been stated, is desirably adapted to be energized during conditions as of take off and emergency wherein the main control device 50 is wide open. To this end, the clutch 90 is shown as linked as by a linkage 94 operative in response to condition of the air valve 56, and as shown is accordingly engageable by a lug 96 carried by the air valve plunger 70. The arrangement is such that in response to wide open position of the main control device 50, the clutch 90 is engaged, and accordingly the linkage 94 and the lug 96 are shown as arranged so that upward movement of lug 96 in response to equalization of pressure in chambers 68a and 68b is effective to actuate linkage 94 to cause the clutch 90 to be engaged.

De-clutching of clutch 90 is correspondingly effected automatically in response to pressure differential across the control 50, which differential would occur as an incident to closure of control 50 from its wide open condition.

The by-pass regulator 92 provides a means for permitting recirculation of fuel in by-pass 88 around the gear pump 80 in any situation wherein excess fuel is being supplied to the main control device 50. Because of the check valve 86, however, unless the gear pump 80 is delivering fuel, open condition of the by-pass regulator 92 does not influence the fuel delivery through the main fuel supply line 46. But where, due to malfunction or other transient condition of the pump 38, the gear pump 80 is delivering fuel, and the system is operating substantially on the output from the gear pump 80, such that the main control device 50 does throttle the fuel so that there is a pressure differential across the control device 50, the by-pass regulator 92 is adapted to sense that pressure drop and open the by-pass 88 to reduce the effective pumping delivery of pump 80 by permitting recirculation around it. The by-pass 88 and regulator 92 are thus necessary to prevent damage to the system where for any reason there is a failure or insufficient output from the centrifugal pump 38 to supply the fuel demands of the engine.

It will be understood that the areas of the chambers 68a and 68b of the regulator 58 and the rating of spring 74 may be so calibrated as to maintain the clutch 90 engaged to drive the pump 80 in the event of inoperativeness or failure of the pump 38 even though a pressure differential exists across the main control device 50, thereby permitting control of the output of the pump 80 through the regulator 92 before it is declutched by air valve plunger 70.

Such sensing of control gear pump 80 is effective by sensing lines 98 and 100 respectively communicating with the fuel line 46 above and below the control device 50. The sensing lines 98 and 100 are shown as leading respectively to regulator chambers 92a and 92b on opposite sides of a diaphragm device 102 of the by-pass regulator 92. The arrangement is such that pressure differential across the main control device 50 results in higher pressure in sensing line 98 and in diaphragm chamber 92a, operative to move a plunger 104 carried on diaphragm 102 to open a valve member 106 normally in a closed position, of the by-pass regulator 92, thereby permitting the recirculation around gear pump 80 as desired.

The conduit 48 which supplies fuel to the after burner nozzles 32 is shown as provided with a control device 108 adapted to regulate the flow to an after burner supply line 109 which leads to the nozzles 32 of the after burners. However, it will be noted that the after burner feed conduit 48 is shown as joined to the main fuel supply conduit 46 upstream of the control device 50 which controls supply of fuel to the main nozzle, and upstream of the flow-responsive sensing tubes 64–66 which sense flow characteristics across that control device 50. Hence, delivery or non-delivery of fuel to the after burner nozzles 32 does not of itself control the pump elements shown controlled by flow to the main nozzles 24.

Figure 2 illustrates a modification of the present invention employing a by-pass to divert fuel from the main fuel control device back to the upstream side of the pumps.

Since the embodiments of Figures 1 and 2 are generally identical in most respects, similar but primed reference numerals are applied to identify corresponding parts of the two embodiments, and the description of such parts given in connection with the embodiment of Figure 1 generally applies to the embodiment illustrated in Figure 2 except where otherwise noted.

In Figure 2, there is shown a fuel-diverting recirculation or by-pass line 110 leading from the main control device 50' which controls supply of fuel to the main engine nozzles 24'. The by-pass 110 leads back to the rear or upstream side of the pumping units 38' and 80' thereby controlling fuel flow to the nozzles 24' by diverting some of the fuel delivered to the supply line 44'.

In this arrangement, the actuation of the main control device 50' is shown as sensed by observing the flow of fuel by-passed through the by-pass line 110. Accordingly, the by-pass line 110 is provided with a restrictive metering or venturi section 112. Sensing lines corresponding to the lines 64' and 66' of the first embodiment are shown as respectively tapping into the by-pass line 110 at a point upstream of the venturi 112 and at a point in the throat of the venturi. Thus, when the main control device 50' is set to by-pass fuel rather than to discharge it to the nozzles 24', fuel flow in the by-pass line 110 will show a pressure drop between the lines 64' and 66'. The responsiveness of the air valve regulator 68' of Figure 2 will accordingly be similar to that of the air valve regulator 68 of the first embodiment, for the relatively high pressure in sensing line 64' as a result of by-pass flow in by-pass 110 indicates a less amount of fuel going to the nozzles 24' than is delivered by the pumps. If, however, the control device 50' is set so that all of the fuel is being used and none is being diverted to by-pass line 110, the lack of pressure differential across sensing lines 64' and 66' permits the air valve 56' to open to deliver air to the air turbine 52' and thus drive the centrifugal pump 38'.

As in the embodiment of Figure 1, the sensing lines 98' and 100' which control the actuation of the by-pass regulator 92' are effectively in parallel with the lines 64' and 66', and so it will be evident that the actuation of the by-pass regulator 92' shown is like that of the by-pass regulator 92 of Figure 1, and specific description thereof need not be repeated here. Moreover, it will be observed that actuation of the gear pump 80' is dependent upon wide open setting of control device 50'.

The correspondency of these and other features of the two embodiments renders further description of the embodiment illustrated in Figure 2 unnecessary.

It will thus be seen from the foregoing description, considered in conjunction with the accompanying drawings, that the present invention provides a new and improved fuel supply system and method having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A fuel system for gas turbine engines and the like having air compressing means and fuel burning means, which comprises an air driven first fuel pump energized by air from said compressing means, a second fuel pump, a clutch drive for selectively activating said second pump, a fuel feed control means for regulating fuel flow to said burning means, conduit means for supplying fuel to both pumps and from said pumps to said control means, a by-pass for selectively connecting the inlet and outlet of said second pump during over-capacity output therefrom, a flow regulator in said by-pass, and means responsive to the fuel flow pressure differential across the feed control means to control the speed of the first pump, the operation of the clutch drive for the second pump and the by-pass flow regulator, said last mentioned means being constructed and arranged to directly effect driving of the second pump and to regulate circulation through the by-pass only when the first pump is not fulfilling the demands of the burning means and to regulate speed of the first pump and declutch the second pump when the first pump is fulfilling the demands of the burning means.

2. A fuel system for gas turbine engines and the like having air compressing means and fuel burning means, which comprises an air driven first fuel pump energized by air from said compressing means, a second engine driven fuel pump, a controllable drive for said second engine driven pump, a fuel feed control means for regulating fuel flow to said burning means, conduit means for supplying fuel to both pumps and from said pumps to said control means, a by-pass selectively connecting the inlet and outlet of said second pump during over-capacity output therefrom, a flow regulator in said by-pass, and chambered diaphragm means responsive to the fuel flow pressure differential across the feed control means to control the speed of the first pump, the operation of the controllable drive for the second pump and the by-pass flow regulator, said chambered diaphragm means being constructed and arranged to effect driving of the second pump and to directly regulate circulation through the by-pass only when the first pump is not fulfilling the demands of the burning means and to regulate speed of the first pump and render non-operating the second pump when the first pump is fulfilling the demands of the burning means.

3. A fuel system for gas turbine engines and the like having air compressing means and fuel burning means, which comprises an air driven first fuel pump energized by air from said compressing means, a second engine driven fuel pump, a controllable drive for said second engine driven pump, a fuel feed control means for regulating fuel flow to said burning means, conduit means for supplying fuel to both pumps and from said pumps to said control means, a by-pass for selectively connecting the inlet and outlet of said second pump during over-capacity flow therefrom, a flow regulator in said by-pass, and chambered diaphragm means responsive to fuel pressure differences across said fuel feed control means to control the speed of the first pump, the operation of the controllable drive for the second pump and the by-pass flow regulator, said diaphragm means being constructed and arranged to effect driving of the second pump and regulate circulation through the by-pass only when the first pump is not fulfilling the demands of the burning means and to regulate speed of the first pump and render non-operating the second pump when the first pump is fulfilling the demands of the burning means.

4. A fuel system for gas turbine engines and the like having air compressing means and fuel burning means, which comprises an air driven centrifugal fuel pump energized by air from said air compressing means, a positive displacement engine driven fuel pump, a controllable drive for said positive displacement pump, a fuel feed control means for regulating fuel flow to said burning means, conduit means for supplying fuel to both pumps and from said pumps to said control means, a by-pass for selectively connecting the inlet and outlet of said positive displacement pump during over-capacity output therefrom, a flow regulator in said by-pass, and means responsive to fuel pressure differences across said fuel feed control means to control the speed of the centrifugal pump, the operation of the controllable drive for the positive displacement pump and the by-pass flow regulator, said last mentioned means being constructed and arranged to effect driving of the positive displacement pump and regulate circulation through the by-pass only when the centrifugal pump is not fulfilling the demands of the burning means and to regulate speed of the centrifugal pump and render non-operating the positive displacement pump when the centrifugal pump is fulfilling the demands of the burning means.

5. A fuel system for turbojet engines and the like having combustion chambers and burners therein and a compressor for supplying a flow of air to said combustion chambers, which comprises a first air turbine driven fuel pump driven by bleed air from said compressor and operable to supply fuel to the burners of said engine, means for controlling the amount of bleed air supplied to said air turbine driven fuel pump, a second engine driven positive displacement fuel pump in parallel flow relation to said first fuel pump, a fuel feed control means directly receiving the fuel flow from each of said pumps for regulating said flow to said burners, conduit means for supplying fuel to said pumps and for communicating the outputs therefrom to said fuel control means, means associated with said second positive displacement pump for effecting selective recirculation therearound whenever the output therefrom exceeds the demands of the system, means responsive to the fuel flow pressure differential across the feed control means to control said bleed air control means and said recirculating means, and conduit means connected immediately adjacent said feed control means to directly communicate the fuel pressure differential across said feed control means to said last mentioned means, said means being constructed and arranged to effect driving of said second positive displacement pump and to regulate circulation therearound only when the first pump is not fulfilling the demands of the system and to regulate the output of the first pump when said pump is fulfilling the demands of the system.

6. A fuel system for turbojet engines and the like having combustion chambers and burners therein and a compressor for supplying a flow of air to said combustion chambers which comprises a first air turbine driven fuel pump driven by bleed air from said compressor and operable to supply fuel to the burners of said engine, means for controlling the amount of bleed air supplied to said air turbine driven fuel pump, a second engine driven positive displacement fuel pump in parallel flow relation to said first fuel pump, a fuel feed control means directly receiving the fuel flow from each of said pumps for regulating said flow to said burners, conduit means for supplying fuel to said pumps and for communicating the outputs therefrom to said control means, by-pass means for selectively connecting the inlet and outlet of said positive displacement pump whenever the output therefrom exceeds the demands of the system, a first chambered diaphragm means connected to said bleed air control means and responsive to the fuel flow pressure differential across the feed control means to control said bleed air control means, a second chambered diaphragm means connected to said by-pass means to control the amount of recirculation around said second pump, and conduit means connected immediately adjacent said feed control means to directly communicate the fuel pressure differential across said feed control means to said first and second chambered diaphragm means to effect differential movement thereof, said first chamber diaphragm means having means associated therewith to activate said second pump only when said first pump is not fulfilling the demands of the system and said second chambered diaphragm means being operable to regulate recirculation through said by-pass means.

References Cited in the file of this patent

UNITED STATES PATENTS

| | | |
|---|---|---|
| 2,674,847 | Davies et al. | Apr. 13, 1954 |
| 2,739,442 | Neal et al. | Mar. 27, 1956 |
| 2,763,986 | Block | Sept. 25, 1956 |
| 2,774,215 | Mock et al. | Dec. 18, 1956 |
| 2,781,727 | Marshall et al. | Feb. 19, 1957 |
| 2,835,323 | Booth | May 20, 1958 |